United States Patent [19]

Brandt et al.

[11] Patent Number: 4,459,968
[45] Date of Patent: Jul. 17, 1984

[54] IGNITION SYSTEM

[75] Inventors: Arnold W. Brandt, Livonia; David H. Fox; Richard H. Lawton, both of Ann Arbor, all of Mich.

[73] Assignee: Ford Motor Company, Dearborn, Mich.

[21] Appl. No.: 499,015

[22] Filed: May 27, 1983

[51] Int. Cl.³ .......................... F02P 1/00; F02P 5/04
[52] U.S. Cl. .................................. 123/643; 123/617
[58] Field of Search ................ 123/643, 617, 473

[56] References Cited

U.S. PATENT DOCUMENTS

| | | | |
|---|---|---|---|
| 4,150,653 | 4/1979 | Grancoin | 123/617 |
| 4,155,341 | 5/1979 | Fernquist | 123/617 |
| 4,176,643 | 12/1979 | Beeghly | 123/643 |
| 4,365,602 | 12/1982 | Stiller | 123/643 |

Primary Examiner—Ronald B. Cox
Attorney, Agent, or Firm—Peter Abolins; Robert D. Sanborn

[57] ABSTRACT

An ignition system for an internal combustion engine having a flywheel coupled to a plurality of bipolar magnets and a camshaft coupled to a unipolar magnet. A bipolar Hall sensor is positioned adjacent the flywheel for detecting passage of the bipolar magnets and generating a square wave signal to provide camshaft position. A unipolar Hall sensor is positioned adjacent the camshaft for detecting the passage of the unipolar magnet and generating a square wave signal to provide a reference signal indicating a known position of one cylinder.

7 Claims, 8 Drawing Figures

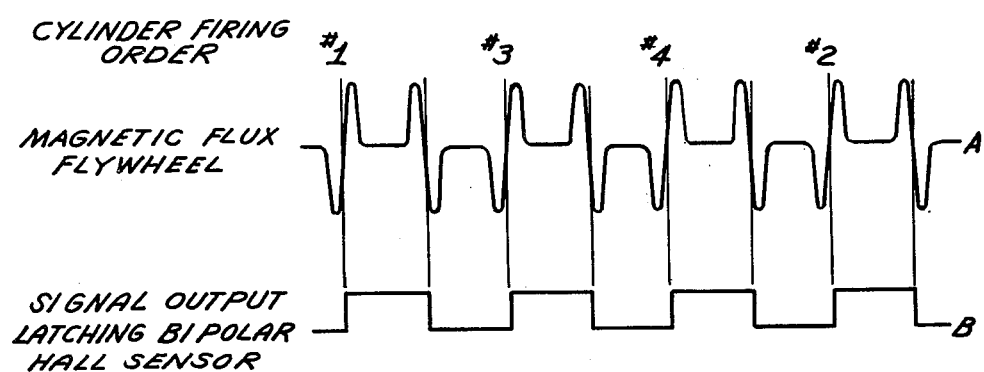
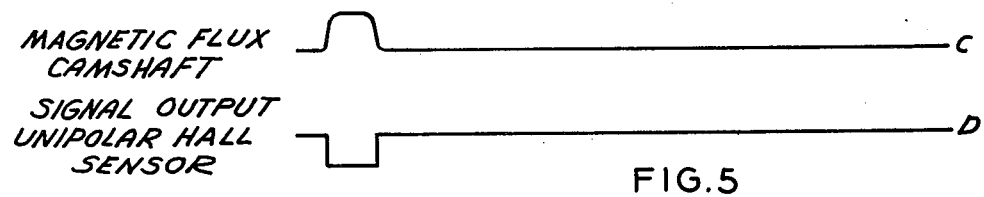
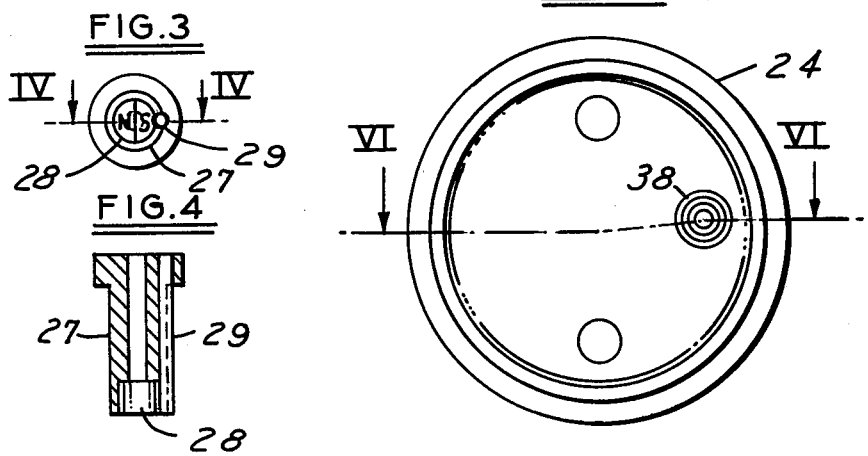
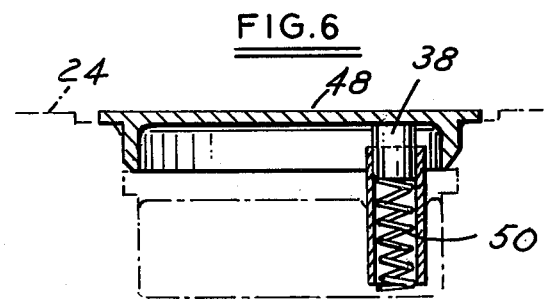

4,459,968

IGNITION SYSTEM

BACKGROUND OF THE INVENTION

1. Field of the invention

This invention relates to ignition systems for internal combustion engines.

2. Prior Art

Various ignition systems are known for internal combustion engines. For example, it is known to have distributors mechanically coupled to the crankshaft and have therein position sensors and voltage distribution rotors. A typical crankshaft position sensor in a distributor includes a magnetic source and magnetic sensor. Relative rotational movement between the magnetic source and sensor produces periodic pulses indicative of crankshaft rotation and position. A typical distributor also includes a rotor distributing secondary high voltage from a central electrode to circumferentially spaced electrodes associated with individual spark plugs.

Also known are distributorless ignition systems. In such systems, an ignition coil is associated with two spark plugs which are simultaneously fired. By having more than one ignition coil and by firing the spark plug both during a compression cycle and an exhaust cycle, it is possible to eliminate the distributor and its associated rotor for distributing spark plug firing energy. Various crankshaft position sensors are known which could be used in association with distributorless ignition systems. For example, the crankshaft or camshaft itself could have placed thereon a magnetic reference point which is sensed upon each revolution. However, the rotation of the crankshaft or camshaft are difficult to associate with individual cylinder firing because there is not a unique rotational position of the crankshaft for the firing of each cylinder. These are some of the problems this invention overcomes.

SUMMARY OF THE INVENTION

An ignition system for an internal combustion engine includes a flywheel with bipolar magnets, a camshaft with a unipolar magnet, a bipolar flywheel Hall sensor and a unipolar camshaft Hall sensor. The flywheel has a plurality of bipolar magnets positioned at spaced intervals around the flywheel, and the camshaft has coupled thereto a single unipolar magnet. A bipolar flywheel Hall sensor is positioned adjacent the flywheel for detecting the passage of the bipolar magnets on the flywheel and generating a square wave signal to provide crankshaft position. A unipolar camshaft Hall sensor is positioned adjacent the camshaft for detecting passage of the unipolar magnet on the camshaft and for generating a square wave signal to provide a reference signal indicating a known piston position of one cylinder, such as top dead center for cylinder one.

The advantages of the system of this invention include a great accuracy provided by the large diameter of the flywheel. Thus there has been achieved accurate initial ignition timing by design and with no adjustment necessary. There is easy access to components for service and the elimination of the distributor. Complexity has been reduced in that the coil drivers have been combined in the coil package and there is a minimum length of spark plug wires. There is improved system durability with elimination of the mechanical distributor.

BRIEF DESCRIPTION OF THE DRAWINGS

FIG. 2 is a graphical representation of the change in the magnetic flux as the flywheel rotates (A), the change in the signal output from the latching bipolar flywheel Hall sensor (B), the change in the magnetic flux as the camshaft rotates (C), and the signal output of the unipolar camshaft Hall sensor (D);

FIG. 3 is a plan view of a bipolar magnet and holder assembly for use in an embodiment of this invention showing the orientation of the magnetic north and south poles relative to the roll pin which in turn orients the magnetic poles when assembled to the flywheel;

FIG. 4 is a section taken along section line IV—IV of FIG. 3;

FIG. 5 is a plan view of a camshaft in accordance with an embodiment of this invention;

FIG. 6 is a section taken along line VI—VI of FIG. 5;

DETAILED DESCRIPTION OF THE INVENTION

Figure 1:
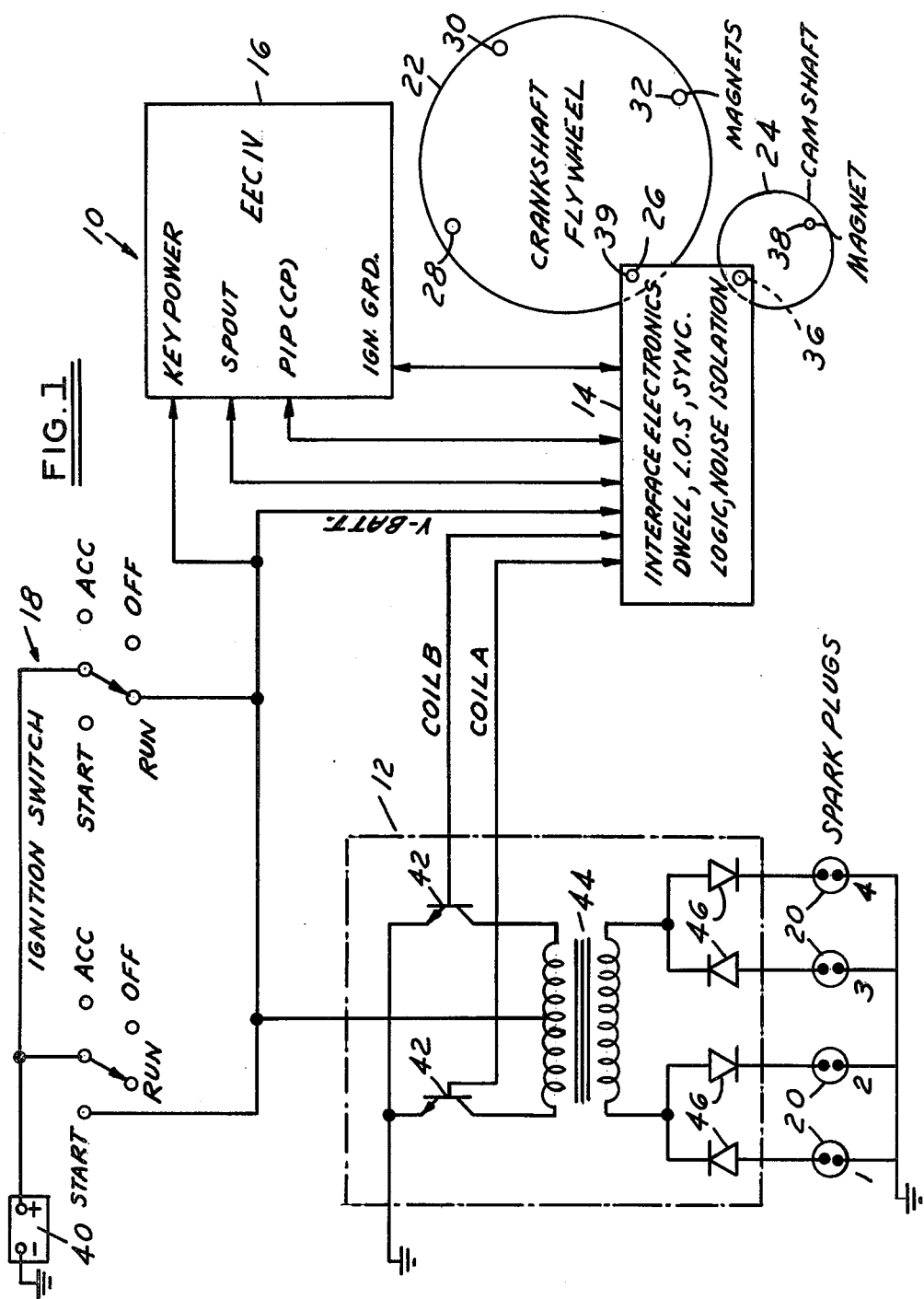
FIG. 1 is a schematic diagram, partly in block form, of an ignition system in accordance with an embodiment of this invention.

Referring to FIG. 1, a distributorless ignition system 10 includes an ignition module 12, interface electronics 15 contained in a housing 14, electronic engine control 16, ignition switch 18, spark plugs 20, crankshaft flywheel 22, and camshaft 24.

Interface electronics 15 contained in an electronics and sensor housing 14 provide control of the ignition dwell, synchronization logic and noise isolation. Further, sensor housing 14 includes a bipolar Hall sensor 26 positioned to sense magnets 28, 30, 32 and 34 on flywheel 22. A unipolar sensor 36 in sensor housing 14 is positioned to be on the rotational path of a unipolar magnet 38 positioned on camshaft 24.

Electronic engine control module 16 processes information received from engine sensors, including a crankshaft position sensor, and determines ignition timing (advance or retard) by a spark initiation (spark out) signal generated by interface electronics 15. A battery 40 is connected to ignition switch 18 which applies power to remainder of distributorless ignition system 10. Ignition module 12 includes a pair of driving transistors 42, an ignition coil 44, and directive diodes 46. Rotation of flywheel 22 generates a signal which provides crankshaft position and ignition timing angle for ignition default operation in case of electronic engine control 16 default.

Ignition coil 44, controlled by interface electronics 15, is coupled to four high voltage secondary terminals containing directive diodes 46 which allow secondary current to flow through a pair of spark plugs, one spark plug firing on the compression stroke while the other plug fires on the exhaust stroke.

Referring to FIG. 2, the rotational movement of bipolar magnets 28, 30 32 and 34 on crankshaft flywheel 22 past bipolar Hall sensor 26 creates a magnetic flux pattern as indicated in the waveform of line A. The term "bipolar" is used herein to indicate the presence of two opposing magnetic poles on one end face of a magnet. The opposing end face of each bipolar magnet would, of course, also have two magnetic poles. Such a magnetic flux adjacent to bipolar Hall sensor 26 causes sensor 26 to produce an output in accordance with the waveform of line B.

Analogously, the magnetic flux adjacent unipolar Hall sensor 36 caused by the rotation of camshaft 24 and unipolar magnet 38 on camshaft 24 is indicated by the waveform of line C. The term "unipolar" is used herein to indicate the presence of a single magnetic pole on one end face of a magnet. The opposing end face would also have a single magnetic pole. The signal output of unipolar sensor 36 in response to the magnetic flux waveform shown on line C is a square wave as illustrated in the waveform of line D.

The square wave signal of line D occurs in conjunction with engine operation and represents the time when a bipolar magnet indicates a known piston position in association with number one cylinder. This information is used by interface electronics 15 to synchronize the ignition coil switching sequence and can also be useful in timing sequential fuel injection. For example, a bipolar magnet may indicate when the piston in a cylinder is 10 degrees before top dead center, and the unipolar magnet would indicate when such information is being supplied about cylinder one.

Referring to FIGS. 3 and 4, bipolar magnet 28 is generally cylindrical with two magnetic poles on each end face. The rotational position of magnet 28 in flywheel 22 is determined by a roll pin 29. Magnet 28 and an opening in flywheel 22 for receiving magnet 28, each have an indentation which, when aligned with each other, can receive roll pin 29. The orientation of the magnetic poles on the end face of magnet 28 is established in a known relationship to the indentation in magnet 28. As a result, mounting magnet 28 on flywheel 22 also orients magnet 28. For mounting, magnet 28 is positioned in one end of an elongated, plug-like magnet housing 27. Magnet housing 27 includes an axial opening for receiving roll pin 29 so as to rotationally orient magnet 28 within magnet housing 27 and rotationally orient the combination of magnet 28 and magnet housing 27 within flywheel 22.

Referring to FIG. 5, camshaft 24 has therein magnet 38. FIG. 6 illustrates a stationary nonmagnetic cover 48 mounted on the engine block which is adjacent to magnet 38. A spring 50 is used to keep magnet 38 pressed against cover 48 as magnet 38 rotates and rubs against cover 48.

Figure 7:
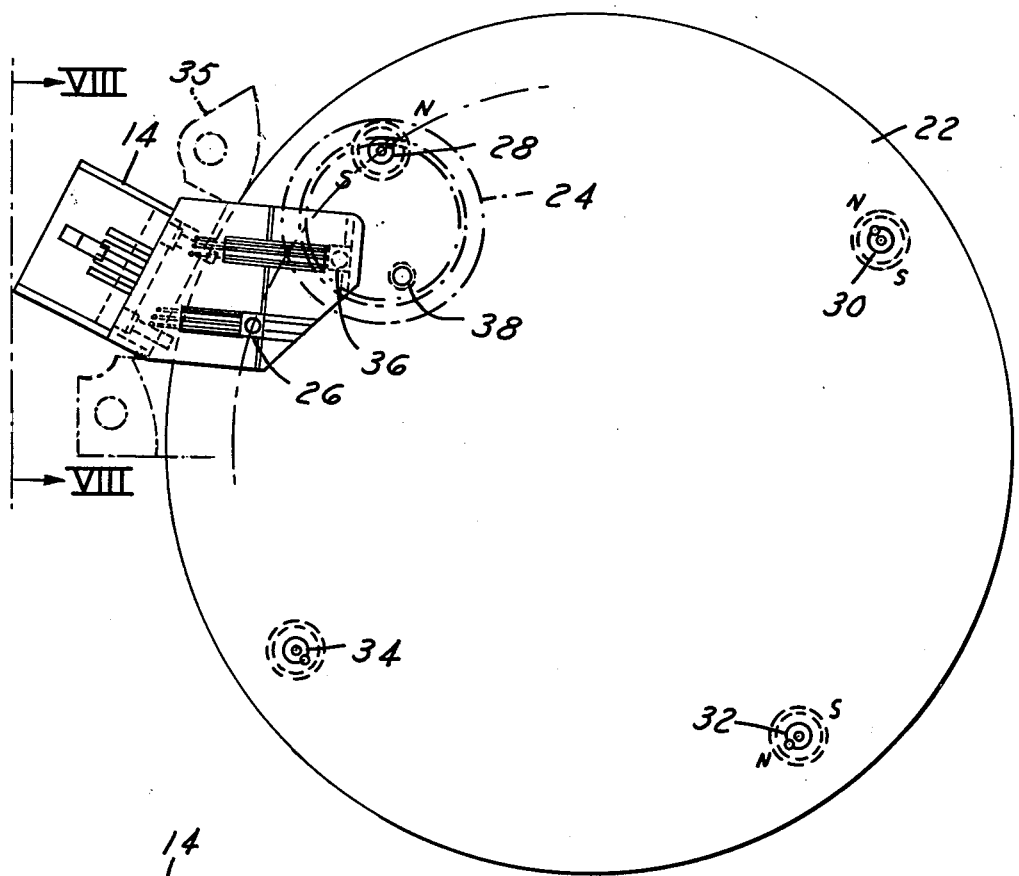
FIG. 7 is an end view representing the relative placement of a flywheel, a camshaft, magnets positioned thereon, and sensors for detecting rotational movement of the magnets in accordance with an embodiment of this invention.
Figure 8:
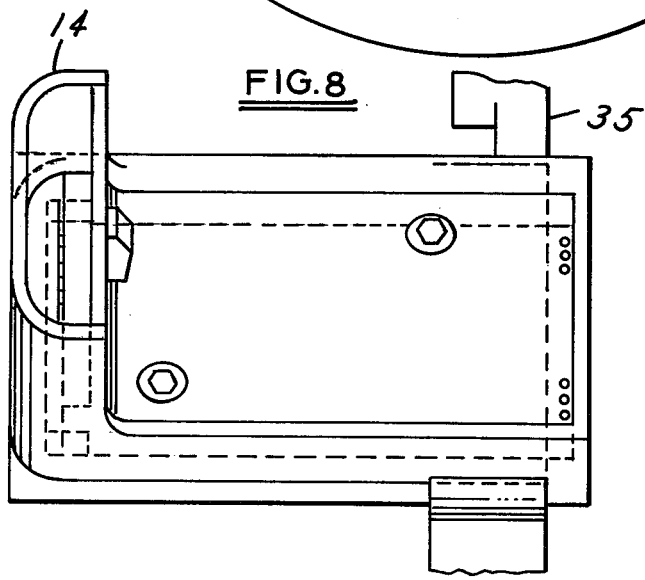
FIG. 8 is a view taken along line VIII—VIII of FIG. 7 showing a housing for the magnetic Hall sensors and interface electronics.

FIG. 7 shows an end view of crankshaft flywheel 22, camshaft 24 and interface electronics housing 14. FIG. 8 shows a more detailed side view of interface electronics housing 14. Note that the positioning of bipolar magnets 28, 30, 32 and 34 is such that circumferentially adjacent magnets have like poles facing each other. That is, each pole of bipolar magnets 28 through 34 have adjacent a bipolar magnet with a pole of the same magnetic polarity. Thus rotation of flywheel 22 produces two adjacent upward going pulses from two adjacent magnets passing bipolar sensor 26. The two opposing poles of the same magnet, for example magnet 28, cause two pulses in opposing directions and result in switching of the square wave signal output of sensor 26.

Interface electronics housing 14 is mounted on an engine block 35 so that sensor 26 is facing toward flywheel 22 and sensor 36 is facing toward the end of camshaft 24. Bipolar magnets 28, 30, 32, and 34 are installed on flywheel 22 with bipolar magnetic end faces pointing toward sensor 26. The rotational orientation of each bipolar magnet 28, 30, 32 and 34 within flywheel 22 is such that a line connecting the two poles of each bipolar magnet is perpendicular to the flywheel radius on which the bipolar magnet is centered. In other words, a transition line marking the boundary between the two poles of each bipolar magnet is substantially aligned with the radius of flywheel 22 on which the bipolar magnet is centered.

In summary, distributorless ignition system 10 performs control of the spark output sequence, prevents crossfiring (undesirable spark firing) when starting the engine, controls the spark dwell to prevent coil overheating, and provides spark directly from the crankshaft position indicator if the computer fails. In addition, it prevents the flow of current through the ignition coil, primary windings except when the engine crankshaft is rotating. This prevents excessive heating of the primary windings.

Distributorless ignition system 10 applies a "latching bipolar Hall sensor" technology to determine crankshaft position relative to cylinder top dead center. Sensor housing 14 houses both bipolar and unipolar sensors 26 and 36 as well as interface electronics. The housing location is accessible for servicing and allows sensors to be actuated by bipolar magnets in the flywheel and a unipolar magnet in the end of the camshaft. The bipolar magnets are advantageously charged prior to assembly to flywheel 22 and accurately positioned to provide accurate crankshaft position. Similarly, unipolar magnet 38 on camshaft 24 is charged before assembly to camshaft 24 and provides a synchronization signal for cylinder identification as camshaft 24 rotates. Advantageously, interface electronics 14 provides a coil dwell time control in accordance with known ignition control techniques.

Various modifications and variations will no doubt occur to those skilled in the various arts to which this invention pertains. For example, the particular method of mounting of the unipolar magnet may be varied from that disclosed herein. These and all other variations which basically rely on the teachings through which this disclosure has advanced the art are properly considered within the scope of this invention.

We claim:

1. An ignition system for an internal combustion engine including:
    a flywheel coupled to a plurality of bipolar magnets having end faces with two opposing magnetic poles with a transition line between each pair of opposing magnetic poles on each bipolar magnet being substantially aligned with a radius of said flywheel, and said bipolar magnets being positioned at spaced intervals around said flywheel;
    a camshaft having coupled thereto a unipolar magnet having an end face with a single magnetic pole;
    a bipolar flywheel Hall sensor positioned adjacent said flywheel for detecting passage of said bipolar magnets and generating a square wave signal to provide camshaft position; and
    a unipolar camshaft Hall sensor positioned adjacent said camshaft for detecting passage of said unipolar magnet and generating a square wave signal to provide a reference signal indicating when a bipolar magnet is in a known position associated with a predetermined cylinder.

2. An ignition system as recited in claim 1 wherein said bipolar magnets are oriented on said flywheel so that both circumferentially adjacent magnetic poles of adjacent bipolar magnets are of the same magnetic orientation.

3. An ignition system as recited in claim 2 wherein said flywheel includes an orientation pin for rotationally positioning the mounting of said bipolar magnets in said flywheel, said bipolar magnet having an indentation for receiving a portion of said orientation pin, said flywheel having flywheel opening for receiving said magnet and a flywheel indentation adjacent said flywheel opening for receiving said orientation pin so that said magnet is rotationally oriented when mounted in said flywheel.

4. An ignition system as recited in claim 3 further comprising a nonmagnetic member mounted on said engine adjacent said unipolar magnet, and a spring biasing said unipolar magnet against said nonmagnetic member so that when said camshaft turns, said unipolar magnet rubs against said nonmagnetic member.

5. An ignition system as recited in claim 4 wherein said bipolar and unipolar Hall sensors are mounted in a sensor housing, said bipolar and unipolar Hall sensors being offset from one another, said bipolar Hall sensor being positioned to intercept only the path of travel of said bipolar magnets, and said unipolar Hall sensor being positioned to intercept only the path of travel of said unipolar magnet.

6. An ignition system as recited in claim 5 wherein said sensor housing further supports associated interface electronics for generating an input signal for an electronic engine control.

7. An ignition system for an internal combustion engine including:

a flywheel;

a plurality of bipolar magnets circumferentially positioned at spaced intervals around said flywheel, said bipolar magnets having end faces with two opposing magnetic poles with a transition line between each pair of opposing magnetic poles on each bipolar magnet being substantially aligned with a radius of said flywheel, and said bipolar magnets being oriented on said flywheel so that circumferentially adjacent magnetic poles of adjacent bipolar magnets are of the same magnetic orientation;

a camshaft;

a unipolar magnet positioned off the axis of rotation on said camshaft and having an end face with a single magnetic pole;

a sensor housing supporting a bipolar flywheel Hall sensor, a unipolar camshaft Hall sensor and associated interface electronics;

said bipolar flywheel Hall sensor being positioned adjacent said flywheel at an intersection with the rotational path of said bipolar magnets for detecting passage of said bipolar magnets and for generating a signal having a positive going portion and a negative going portion for the passage of each of said bipolar magnets;

said unipolar camshaft Hall sensor being positioned adjacent said camshaft at an intersection with the rotational path of said unipolar magnet for detecting passage of said unipolar magnet and for genrating a signal having a pulse of one polarity indicating the association of a predetermined engine cylinder with a signal generated by said bipolar flywheel Hall sensor; and said flywheel including an orientation pin for rotationally positioning the mounting of said bipolar magnets in said flywheel, each of said bipolar magnets having an indentation for receiving a portion of said orientation pin, said flywheel having a flywheel opening for receiving said magnet and a flywheel indentation for receiving a portion of said orientation pin so that said magnet is rotationally oriented when mounted in said flywheel.

* * * * *